United States Patent [19]

Plummer, III

[11] 3,955,601

[45] May 11, 1976

[54] HEAT INSULATING JACKET FOR A CONDUIT EQUIPPED WITH SELF-LOCKING SEAM

[75] Inventor: Walter A. Plummer, III, Tempe, Ariz.

[73] Assignee: Moore Business Forms, Inc., Niagara Falls, N.Y.

[22] Filed: Apr. 7, 1975

[21] Appl. No.: 565,623

Related U.S. Application Data

[63] Continuation-in-part of Ser. No. 310,257, Nov. 29, 1972, Pat. No. 3,925,856.

[52] U.S. Cl.................. 138/149; 138/168; 138/154
[51] Int. Cl.² .............. F16L 9/14; F16L 9/00
[58] Field of Search ........... 138/149, 104, 128, 137, 138/138, 139, 162, 168, DIG. 10; 24/201 C, 201 HH, 230.5 R

[56] References Cited
UNITED STATES PATENTS

| | | | |
|---|---|---|---|
| 1,718,983 | 7/1929 | Schneible | 138/168 |
| 1,871,508 | 8/1932 | Gardner | 138/149 |
| 2,756,172 | 7/1956 | Kidd | 138/149 X |
| 2,790,464 | 4/1957 | Stephens et al. | 138/149 X |
| 2,937,664 | 5/1960 | Plummer | 138/168 X |
| 3,434,502 | 3/1969 | Snelling | 138/149 X |
| 3,565,118 | 2/1971 | Stearns | 138/149 X |
| 3,572,394 | 3/1971 | Davis | 138/154 |
| 3,858,282 | 1/1975 | Plummer | 138/168 X |

Primary Examiner—Richard E. Aegerter
Assistant Examiner—Larry Jones

[57] ABSTRACT

A laminated heat insulating jacket for conduits having a self-locking separable plastic seam for holding the jacket assembled about a fluid conveying conduit and more particularly a conduit of the type embraced by a heat tracer tube helpful in heating the fluid conduit and its contents. The exterior layer or main body of the jacket comprises suitable impervious plastic strip material equipped along its lateral edges with separable seam forming members. Laminated to the main body strip are one or more layers of resilient heat insulating material and an exposed layer of foil-like heat conducting and heat reflective material serving to minimize heat losses from the conduit and to distribute heat from a heat tracer tube to adjacent areas of a fluid conduit embraced thereby.

4 Claims, 2 Drawing Figures

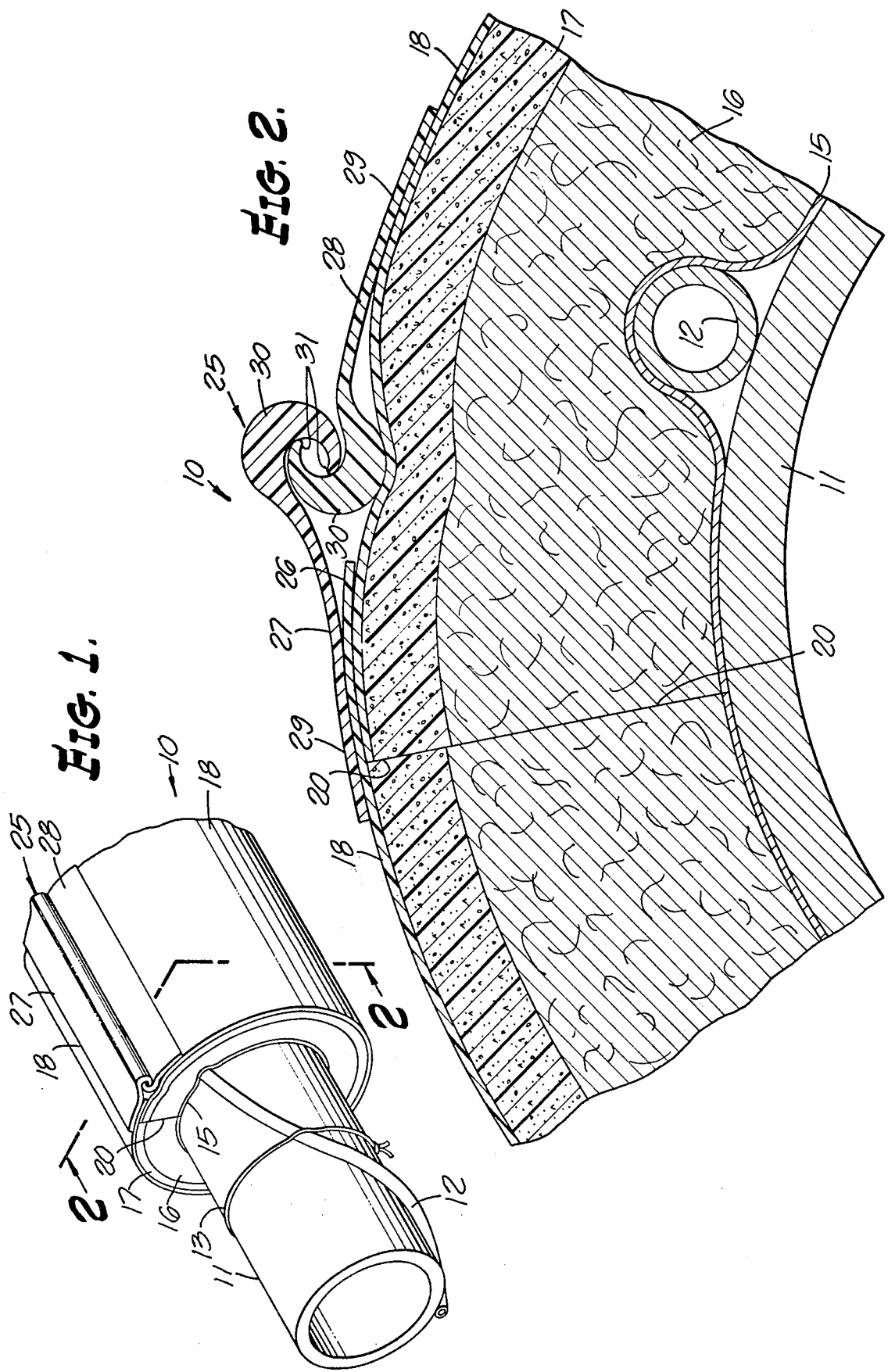

HEAT INSULATING JACKET FOR A CONDUIT EQUIPPED WITH SELF-LOCKING SEAM

This application is a continuation-in-part of my co-pending application for United States Letters Patent Ser. No. 310,257, filed Nov. 29, 1972, now U.S. Pat. No. 3925856.

This invention relates to heat insulating jackets for conduits and more particularly to an improved laminated jacket equipped with a readily assembled separable seam and which jacket includes at least one layer of heat insulating material and an innermost layer of excellent heat reflecting and heat conducting material adapted to lie in direct contact with the conduit to be insulated.

Many proposals have been made heretofore for enclosing conduits and tubular passages generally with heat insulating jackets utilizing various techniques and expedients for holding the insulating material assembled about the conduit. However, these prior proposals are subject to various shortcomings and disadvantages avoided by the present invention including unsightliness, lack of fluid tightness, greater complexity, and are more costly and time consuming to install.

More particularly, these prior jacket constructions lack suitable means for distributing heat from heat tracer tubing to adjacent areas of a conduit embraced by the tracer tubing. For example, there are certain conduit assemblies utilizing relatively small diameter tubing in intimate contact with the exterior of the main conduit and utilized to supply heat continuously, or intermittently upon need, to the main conduit and its contents. Such heater tubes are known as "heat tracers" and may be equipped interiorly with electric heating means or may convey steam or other heating medium for use in heating the main conduit under certain conditions. Such tracer tubes are commonly wrapped spirally about the main conduit and are held pressed in intimate contact therewith. The small area of contact between the tracer and the main conduit provides relatively low efficiency heat transfer capability which undesirable characteristic is greatly minimized by the present invention.

Additionally the seam forming means previously provided for holding insulating jacketing assembled about conduits requires tools for sliders of various constructions which must be manipulated lengthwise of the seam to close or open it. Attempts have been made to provide a seam of this general character and so designed as to provide a fluid seal when assembled but these constructions have not proven reliable and satisfactory in practice. Another shortcoming of prior insulating jackets equipped with separable closure seams is the lack of adequate provision for insuring a uniformly contoured external appearance when assembled over irregularities, obstructions or accessories on or associated with the conduit being jacketed.

The foregoing and other shortcomings of heat insulating jackets are obviated by the present invention. The jacket provided by this invention in a typical embodiment utilizes an innermost layer of heat reflecting, heat conducting material laminated to one or more layers of high efficiency heat insulating material which is laminted in turn to an outer layer of supply flexible impervious material. The opposite lateral edge portions of the outer layer are equipped with improved self-locking seam forming means designed to interlock and provide a fluid-tight seal in partial reliance on the elastic and resilient characteristics of the underlying abutting edges of the heat insulating layer. The innermost foil-like heat conducting layer and the spongy resilient heat insulating material laminated to the conductive layer readily conform to the exterior surface of a heat tracer tube wrapped about the main conduit being insulated and the tautness of the resilient insulation serves to hold the conductive layer pressed firmly against the tracer and the main conduit. Owing to the intimate wide area contact between the heat conducting layer and the tracer tube, high efficiency heat exchange takes place with the result that heat from the tracer tube is conducted quickly and effectively to wide areas of the main conduit to either side of the tracer tube. Additionally, the heat reflecting characteristics of the conductive layer aid in the heat transfer as well as in minimizing heat losses outwardly through the jacket.

Accordingly, it is a primary object of this invention to provide an improved heat insulating jacket equipped with an improved self-locking separable seam, and including a heat-reflecting heat-conducting layer in direct contact with the surface of the conduit being insulated.

Another object of the invention is the provision of a high efficiency heat insulating jacket having a plurality of laminations including a layer of resilient heat insulating material sandwiched between an innermost layer of heat conducting heat reflecting material and the outer main body of the jacket.

Another object of the invention is the provision of a heat insulating jacket adapted to be removably assembled about a conduit embraced by heat tracer tubing which jacket includes a heat conducting inner layer adapted to lie pressed against major areas of the tracer tubing and a supporting conduit for the purpose of distributing heat from the tracer to said conduit more efficiently and more effectively.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary perspective view of an illustrative embodiment of the invention jacket in assembled position about a conduit; and FIG. 2 is a fragmentary corss-sectional view of a portion only of the FIG. 1 assembly taken along line 2—2 thereon.

Referring initially more particularly to FIG. 1, there is shown one illustrative embodiment of the invention jacket, designated generally 10, assembled about a conduit 11 of any suitable metal or plastic material. In many instances such conduits are provided with a heat tracer or control tube 12 conveying a hot fluid for heating the contents of the conduit where such heating may be desirable for some reason as, for example, to lower the viscosity of the contents of conduit 11 or keep these contents from freezing under adverse temperature conditions. It will be understood that conduit 12 may house an electric heater or comprise a strip electrical heater of a well known type having similar purposes and functions. Such tracer tubes or heaters may be secured to the exterior of conduit 11 in any suitable manner, as by tie strings 13 located at intervals along its length. Jacket 10 is best shown in FIG. 2 as comprising an inner layer 15 of aluminum foil or the like heat conductive heat-reflecting material laminated to the adjacent surface of a thick layer 16 of resilient heat-insulating material, such as randomly arrayed glass fibers suitably bonded to one another at points of crossover.

It will be understood that the snug fit of jacket 10 about conduit 11 and heat tracer tubing 12 together with the resiliency of the heat insulating layers 16 and 17 cooperate in holding the ductile heat conducting layer 15 firmly pressed against both the tracer tubing 12 and conduit 11. In consequence, layer 15 is highly efficient in distributing heat from the tracer tubing 12 to wide areas of conduit 11 to either side of the tracer. Additional portions of heat are reflected inwardly by layer 15 further aiding in the heat distribution and minimizing heat loss. As will be recognized these various cooperating modes of increasing heat distribution from the tracer to the main conduit permits the use of higher operating tracer temperatures without risk of damage to the conduit.

A second heat-insulating layer 17 of spongy elastomeric material, preferably but not necessarily of the closed cell type, is laminated to the adjacent surface of layer 17 and its opposite surface is likewise suitably bonded and laminated to an impervious, flexible and supple outer layer 18 such as thermoplastic material. Layer 17 is preferably highly elastic and impervious to fluids.

It is pointed out that layers 15, 16 and 17 have a width sufficiently greater than the circumference of the conduit to be enclosed or jacketed that their abutting edges 20 are placed in both radial and circumferential compression when assembled about the conduit and held so assembled by the interlocking seam designated generally 25. It will also be noted that the outer plastic layer 18 has a width substantially greater than the width of layers 16 and 17 to provide a sealing flap 26 underlying one of the seam-forming members 25 and having an important function to be described more fully presently.

Interlocking seam 25 comprises a pair of seam-forming members 27, 28 of identical generally J-shape configuration. The long stem portions 29 of these members provide a wide mounting strip 29 of approximately the same thickness as layer 18 which is secured along the lateral edge portions of layer 18 by heat fusing, bonding or other suitable technique. One lateral edge of each of the seam-forming members 27, 28 is channel or crescent shaped in cross-section, as is indicated at 30, and the bottom portion of the crescent is several times thicker than the mounting strip 29. The opposite side walls of the c- or crescent-shaped portion converge to a relatively thin lip edge at 31 whereas the opposite edge merges with mounting strip 29.

The exterior surfaces of the free lip edge of the crescent-shaped portions are generally complemental in shape to the interior surfaces of the trough along the opposite side as clearly appears in FIG. 2. Another feature of the design is the fact that a median plane through the mounting strips 29, when the seam members are assembled and under load, preferably substantially bisects the distance between the side walls of the trough-shaped portions of the seam members in their normally assembled position. Another characteristics of the assembled seam when under load is the fact that the lip edges of the crescent shaped portions of the seam members lie on the opposite sides of a plane passing through mounting strips 29. In consequence, the relatively thin and flexible lip edge portions of the seam members contact the interior surface of the two trough shaped portions along lines lying close the the plane of mounting strip 29. Moreover, the wide openings into the channel-shaped interior portions face in opposite directions and toward the respective mounting webs. It follows that these channel portions are readily interlocked with one another as they are overlapped and then released into internesting and interlocking engagement.

Once interlocked, the seam forming members are held positively engaged by the compressive forces acting between the abutting edges of the insulating layers 16 and 17 and in a plane extending transversely of and parallel to the jacket seam when closed. Since the circumference of these layers is substantially greater than that of conduit 11, layers 16 and 17 are under compression both radially and circumferentially of conduit 11 and these compressive forces mutually cooperate in holding seam members 27, 27 interlocked.

Additionally, the radial compressive forces underlying the mounting strip 29 of seam member 27 press outwardly against the free edge portion 26 of jacket layer 18 thereby forming a highly effective fluid-tight seal between the inner surface of member 26 and the underlying exterior surface of layer 18. This very effective seal is further augmented by the double seal provided by each of the free lip edges 31, 31 of the channel-shaped members 30, 30 of the seam.

It will also be observed from FIG. 2 that the exterior surface of jacket 10 is free of bulges radially opposite the tracer or control tube 12. This result is achieved because of the thickness, flexibility and resiliency of layers 16 and 17 and the ability of the foil layer 15 to accommodate itself to tube 12.

From the foregoing it will be recognized that the described heat-insulating jacket and the self-locking seam provided therefor represent a distinct advantage over prior constructions. The simple, self-locking seam 25 is readily assembled simply by overlapping the bulbous free edges of the seam forming members 27, 28 until they overlap into internested engagement where they are firmly held in fluid-tight manner by the compressive forces acting circumferentially and radially of the resilient insulating layer of the jacket. No tools or sliders of any kind are required and the seam can be opened for disassembly or inspection simply by pressing the portions of the jacket to either side of the seam toward one another until the bulbous channel-shaped portions 30 of the seam are disengaged. This operation is usually performed near one end of the seam following which the outer free edge of the disengaged seam can be lifted away from the other seam member progressively toward the other end of the jacket until the full length of the seam is disengaged. The assembled jacket is unusually neat in appearance, free from both depressions or protuberances and fastener devices.

While the particular heat insulating jacket for a conduit equipped with self-locking seam herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A heat insulating tubular jacket for snug assembly about a conduit of the type embraced by heat tracer tubing, said jacket comprising a unitary laminated assembly including an impervious flexible relatively thin outer layer, at least one relatively thick resilient layer of heat insulating material, and an inner layer of relatively thin ductile heat conductive material adapted to lie flush against a conduit and the juxtaposed surface of heat tracer tubing embracing the conduit when said tubular jacket is snugly assembled thereabout, interengaging seam forming members of extruded plastic material secured along the opposite lateral edge portions of said flexible outer layer of said jacket having edge portions shaped to internest when overlapped with one another after said jacket has been snugly assembled about a conduit, and said jacket and the resiliency of said heat insulating material being adapted and effective to hold said heat conductive layer pressed firmly against the heat tracer tubing and the exterior of the conduit thereby to distribute heat from the tracer tubing to portions of the conduit spaced to either lateral side of the tracer tubing.

2. A heat insulating jacket as defined in claim 1 characterized in that said heat conductive layer is an effective heat reflector cooperable with said heat insulating layer to minimize heat losses outwardly through said jacket.

3. A heat insulating jacket as defined in claim 1 characterized in that said seam forming members have oppositely facing channel portions of crescent shape in cross section, each of said channel portions having a relatively flexible lip edge positioned to seat against and form a seal with the interior surface of the channel portion of the other of said seam forming members when said channel portions are internested with one another.

4. In combination with a conduit snugly embraced lengthwise thereof with relatively small diameter heat tracer tubing to distribute heat to said conduit, that improvement which comprises: a unitary readily-detachable longitudinally-seamed heat insulating and heat distributing jacket embracing said conduit and tracer tubing, said jacket having an impervious flexible relatively thin outer layer and at least one relatively thick resilient mid-layer of heat insulating material and an inner layer of relatively thin ductile heat conductive and heat reflective material held pressed against said heat tracer tubing and against said conduit by said resilient mid-layer to distribute heat to said conduit, interengaging seam-forming members of extruded plastic material secured along the opposite lateral edge portions of said flexible outer layer having portions shaped to internest when overlapped with one another during assembly of said jacket about said conduit and heat tracer tubing whereby said jacket and the resiliency of said mid-layer cooperate in holding said heat conductive layer pressed against juxtapoed surfaces of said heat tracer tubing and of said conduit and thereby effective to distribute heat from said tracer tubing to portions of said conduit to either lateral side of said tracer tubing.

\* \* \* \* \*

UNITED STATES PATENT OFFICE
CERTIFICATE OF CORRECTION

Patent No. 3,955,601                 Dated May 11, 1976

Inventor(s) Walter A. Plummer, III

It is certified that error appears in the above-identified patent and that said Letters Patent are hereby corrected as shown below:

On the cover sheet item [73] should read:

Assignee: -- Walter A. Plummer, Sherman Oaks, California --.

Signed and Sealed this

Thirty-first Day of August 1976

[SEAL]

Attest:

RUTH C. MASON
*Attesting Officer*

C. MARSHALL DANN
*Commissioner of Patents and Trademarks*